United States Patent
Zhang et al.

(10) Patent No.: US 10,580,372 B2
(45) Date of Patent: Mar. 3, 2020

(54) METHOD FOR DRIVING PIXEL UNIT

(71) Applicants: BEIJING BOE DISPLAY TECHNOLOGY CO., LTD., Beijing (CN); BOE TECHNOLOGY GROUP CO., LTD., Beijing (CN)

(72) Inventors: Zhenyu Zhang, Beijing (CN); Fangyu Wang, Beijing (CN); Dongchuan Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/049,128

(22) Filed: Jul. 30, 2018

(65) Prior Publication Data

US 2019/0122624 A1 Apr. 25, 2019

(30) Foreign Application Priority Data

Oct. 23, 2017 (CN) .......................... 2017 1 0992682

(51) Int. Cl.
*G09G 3/36* (2006.01)
*G02F 1/133* (2006.01)
*G02F 1/1362* (2006.01)
*G02F 1/1368* (2006.01)

(52) U.S. Cl.
CPC ......... *G09G 3/3648* (2013.01); *G02F 1/1368* (2013.01); *G02F 1/13318* (2013.01); *G02F 1/136213* (2013.01); *G02F 1/136286* (2013.01); *G02F 2201/121* (2013.01); *G09G 2320/066* (2013.01); *G09G 2320/0626* (2013.01); *G09G 2360/145* (2013.01)

(58) Field of Classification Search
CPC ........... G09G 3/3648; G09G 2320/066; G09G 2360/145; G09G 2320/0626; G02F 1/136213; G02F 1/136286; G02F 1/13318; G02F 1/1368; G02F 2201/121
See application file for complete search history.

(56) References Cited

U.S. PATENT DOCUMENTS

| | | | |
|---|---|---|---|
| 7,760,164 B2 * | 7/2010 | Shin ..................... | G09G 3/3233 345/76 |
| 8,358,258 B1 * | 1/2013 | Fan ......................... | G09G 3/32 345/82 |
| 2003/0218116 A1 * | 11/2003 | Boer ................. | H01L 27/14609 250/208.1 |
| 2009/0146067 A1 * | 6/2009 | Otani ....................... | G01J 1/42 250/370.01 |

(Continued)

*Primary Examiner* — Carolyn R Edwards
(74) *Attorney, Agent, or Firm* — Brooks Kushman P.C.

(57) ABSTRACT

A pixel unit and a driving method thereof, a liquid crystal panel and a display device are provided. The pixel unit includes a pixel electrode, a control circuit, a light sensing circuit, a data line and a gate line. A control end of the control circuit is connected to the gate line, a first end of the control circuit is connected to the date line, a second end of the control circuit is connected to a first end of the light sensing circuit, and a second end of the light sensing circuit is connected to the pixel electrode. The control circuit is configured to control, under control of the gate line, the data line to be connected to the first end of the light sensing circuit.

4 Claims, 3 Drawing Sheets

(56) References Cited

U.S. PATENT DOCUMENTS

| | | | |
|---|---|---|---|
| 2012/0242920 A1* | 9/2012 | Xu | G02F 1/136213 |
| | | | 349/42 |
| 2013/0114297 A1* | 5/2013 | Kim | G02B 6/0036 |
| | | | 362/611 |
| 2016/0140917 A1* | 5/2016 | Hyung | G09G 3/3648 |
| | | | 345/694 |
| 2016/0170517 A1* | 6/2016 | Donnelly | G06F 3/0412 |
| | | | 345/174 |
| 2016/0321987 A1* | 11/2016 | Oh | G09G 3/3648 |

* cited by examiner

METHOD FOR DRIVING PIXEL UNIT

CROSS-REFERENCE TO RELATED APPLICATION

This application claims priority to Chinese Patent Application No. 201710992682.2 filed on Oct. 23, 2017, which is incorporated herein by reference in its entirety.

TECHNICAL FIELD

The present disclosure relates to the field of display technology, and more particularly, to a pixel unit and a driving method thereof, a high dynamic range liquid crystal panel and a display device.

BACKGROUND

Compared with a normal image, a High Dynamic Range (HDR) image may provide broader dynamic range and more image details and may reveal a better visual effect in real environment. The HDR image reveals more vivid colors and darker black, and objects in the HDR image are clearer. A display panel in related technology is usually subjected to problems such as dark-state light leakage, so a real effect can hardly be restored from a black image. Hence, an HDR display device in the related technology requires a backlight source to alleviate the dark-state light leakage and the quantity of HDR partitions needs to be increased by increasing the quantity of the backlight sources.

SUMMARY

In a first aspect, the present disclosure provides a pixel unit. The pixel unit includes a control circuit, a light sensing circuit, a data line and a gate line. A control end of the control circuit is connected to the gate line, a first end of the control circuit is connected to the date line, a second end of the control circuit is connected to a first end of the light sensing circuit, and a second end of the light sensing circuit is connected to the pixel electrode. The control circuit is configured to control, under control of the gate line, the data line to be connected to the first end of the light sensing circuit. The light sensing circuit is configured to control the second end of the control circuit to be connected to the pixel electrode in a case that a difference between a potential at the first end of the light sensing circuit and a potential at the second end of the light sensing circuit is higher than a first potential difference, and is further configured to convert a light signal received by the light sensing circuit into an electrical signal in a case that the potential at the first end of the light sensing circuit is lower than the potential at the second end of the light sensing circuit.

Optionally, the control circuit includes a control transistor, a control electrode of the control transistor is connected to the gate line, a first electrode of the control transistor is connected to the data line, and a second electrode of the control transistor is connected to the first end of the light sensing circuit.

Optionally, the light sensing circuit includes a photosensitive diode, an anode of the photosensitive diode is connected to the second end of the control circuit and a cathode of the photosensitive diode is connected to the pixel electrode, and the first potential difference is equal to a breakover voltage of the photosensitive diode.

Optionally, the pixel unit further includes a storage capacitor and a common electrode, one end of the storage capacitor is connected to the pixel electrode and the other end of the storage capacitor is connected to the common electrode.

Optionally, in the case that the difference between the potential at the first end of the light sensing circuit and the potential at the second end of the light sensing circuit is higher than the first potential difference, the second end of the control circuit is connected to the pixel electrode, and a voltage outputted from the data line charges the storage capacitor through the control circuit and the light sensing circuit; and in the case that the potential at the first end of the light sensing circuit is lower than the potential at the second end of the light sensing circuit, the light sensing circuit converts the received light signal into the electrical signal, the storage capacitor discharges and a potential at the pixel electrode is changed based on the electrical signal.

Optionally, the pixel unit further includes a liquid crystal layer arranged between the pixel electrode and the common electrode, and a voltage at the pixel electrode controls a deflection state of liquid crystal in the liquid crystal layer.

In a second aspect, the present disclosure further provides a method for driving the above-mentioned pixel unit. A display period of the pixel unit includes a charging stage, a light sensing stage and a maintaining stage that are set successively. In one display period, the method includes:

in the charging stage, outputting a first voltage by the data line; controlling, by the control circuit under control of the gate line, the data line to be connected to the first end of the light sensing circuit to enable that the difference between the potential at the first end of the light sensing circuit and the potential at the second end of the light sensing circuit is higher than the first potential difference; and controlling, by the control circuit, the second end of the control circuit to be connected to the pixel electrode to charge the storage capacitor using the first voltage outputted by the data line;

in the light sensing stage, outputting a second voltage by the data line, where the second voltage is lower than the first voltage; controlling, by the control circuit under control of the gate line, the data line to be connected to the first end of the light sensing circuit to enable that the potential at the first end of the light sensing circuit is lower than the potential at the second end of the light sensing circuit; and converting, by the light sensing circuit, the light signal received by the light sensing circuit into the corresponding electrical signal such that the storage capacitor discharges to the data line and a potential at the pixel electrode is changed based on the electrical signal; and in the maintaining stage, controlling, by the control circuit under control of the gate line, the data line to be disconnected to the first end of the light sensing circuit to maintain the potential at the pixel electrode.

Optionally, the step of converting, by the light sensing circuit, the light signal received by the light sensing circuit into the corresponding electrical signal includes: converting, by the photosensitive diode, the light signal received by the photosensitive diode into a current signal, wherein a direction of the current signal flows from the cathode of the photosensitive diode to the anode of the photosensitive diode.

In a third aspect, the present disclosure further provides a high dynamic range liquid crystal panel, including a plurality of pixel units arranged in an array, a plurality of gate lines and a plurality of data lines. The plurality of gate lines extends in a row direction and the plurality of data lines extends in a column direction. The plurality of pixel units located at the same row is connected to a corresponding row of gate line. The plurality of pixel units located at the same column is connected to a corresponding column of data line.

The high dynamic range liquid crystal panel further includes a substrate, and the plurality of pixel units is arranged on the substrate.

In a fourth aspect, the present disclosure further provides a display device, including the above-mentioned liquid crystal panel and a display panel stacked with the liquid crystal panel, and the liquid crystal panel is located at a light-outgoing side of the display panel.

Optionally, the display panel is partitioned into a plurality of display regions, and the plurality of display regions has a one-to-one correspondence with the plurality of pixel units of the liquid crystal panel.

Optionally, the light sensing circuit in one of the plurality of pixel units of the liquid crystal panel is configured to receive the light signal sent from one of the plurality of display regions of the display panel corresponding to the pixel unit.

Optionally, the display device further includes an edge-type backlight source arranged at a lateral side of the display panel.

DETAILED DESCRIPTION

Figure 1:
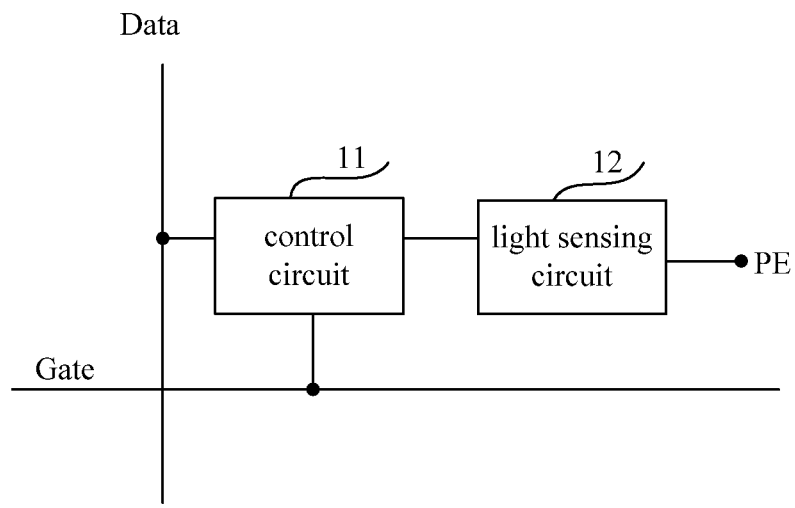
FIG. 1 is a schematic structural diagram of a pixel unit according to some embodiments of the present disclosure.

Technical solutions in embodiments of the present disclosure are described hereinafter in a clear and complete manner in conjunction with drawings in the embodiments of the present disclosure. Apparently, described embodiments are merely a part of rather than all of the embodiments of the present disclosure. Other embodiments obtained by the ordinary skilled in the art based on these disclosed embodiments without paying creative efforts all fall in protection scope of the present disclosure.

An HDR display device in related technology needs to be improved by incorporating with backlight sources, and HDR is achieved by adjusting brightnesses of backlight sources corresponding to respective regions of a display panel; hence, the backlight sources are of short service life. In addition, for the HDR display device in the related technology, the quantity of HDR partitions needs to be increased by increasing the quantity of backlight sources while the cost increases as the quantity of the backlight sources increases. Furthermore, in a case that the HDR display device in the related technology is provided with edge-type backlight sources, it may merely achieve a one-dimensional control HDR effect since the edge-type backlight sources are arranged in a one-dimensional way; in a case that the HDR display device in the related technology is provided with direct-type backlight sources, it is hard to fabricate an ultra-thin display device as restricted by a light-mixing distance.

The present disclosure provides a pixel unit and a driving method thereof, a HDR liquid crystal panel and a display device, which may solve the problems of short service life of backlight sources and increased cost of a large quantity of required backlights since an HDR display device in the related technology requires to adjust lightnesses of backlight sources in respective regions to alleviate dark-state light leakage and needs to increase the quantity of the backlight sources to increase the quantity of HDR partitions.

A transistor in each embodiment of the present disclosure may be a thin-film transistor, a field-effect transistor or any other element having similar characteristics. In the embodiments of the present disclosure, a gate electrode is a control electrode; as to distinguish the other two electrodes, one of the other two electrodes is called as a first electrode and the other is called as a second electrode. Practically, the first electrode may be a drain electrode and the second electrode may be a source electrode, or else, the first electrode may be the source electrode and the second electrode may be the drain electrode.

Optionally, a transistor in each embodiment of the present disclosure may be a triode. In this case, the control electrode of the transistor may be a base electrode, and as to distinguish the other two electrodes, one is called as a first electrode and the other is called as a second electrode. Practically, the first electrode may be a collecting electrode and the second electrode may be an emitting electrode; or else, the first electrode may be the emitting electrode and the second electrode may be the collecting electrode.

A pixel unit according to an embodiment of the present disclosure is applied to an HDR liquid crystal panel. As shown in FIG. 1, the pixel unit includes a pixel electrode PE, a control circuit 11, a light sensing circuit 12, a gate line Gate and a data line Data.

A control end of the control circuit 11 is connected to the gate line Gate, a first end of the control circuit 11 is connected to the date line Data, and a second end of the control circuit 11 is connected to a first end of the light sensing circuit 12. A second end of the light sensing circuit 12 is connected to the pixel electrode PE.

The control circuit 11 is configured to control, under control of the gate line Gate, connection and disconnection between the data line Data and the first end of the light sensing circuit 12.

The light sensing circuit 12 is configured to control the second end of the control circuit 11 to be connected to the pixel electrode PE in a case that a difference between a potential at the first end of the light sensing circuit 12 and a potential at the second end of the light sensing circuit 12 is higher than a preset potential difference, and is further configured to convert a light signal received by the light sensing circuit 12 into an electrical signal in a case that the potential at the first end of the light sensing circuit 12 is lower than the potential at the second end of the light sensing circuit 12.

The pixel unit according to the embodiment of the present disclosure can convert the light signal received by the light sensing circuit 12 into a corresponding electrical signal through the light sensing circuit 12, a voltage at the pixel electrode PE can be changed based on the electrical signal, thereby changing deflection states of liquid crystals, and accordingly, a transmittance of a partition corresponding to the pixel unit is changed. The transmittance of a partition where receives bright light is high and the transmittance of a partition where receives dark light is low, thereby enhancing a display contrast.

In practical, the preset potential difference may be selected according to actual situations. For example, in a case that the light sensing circuit is a photosensitive diode, the preset potential difference is equal to a break-over voltage of the photosensitive diode.

Figure 2:
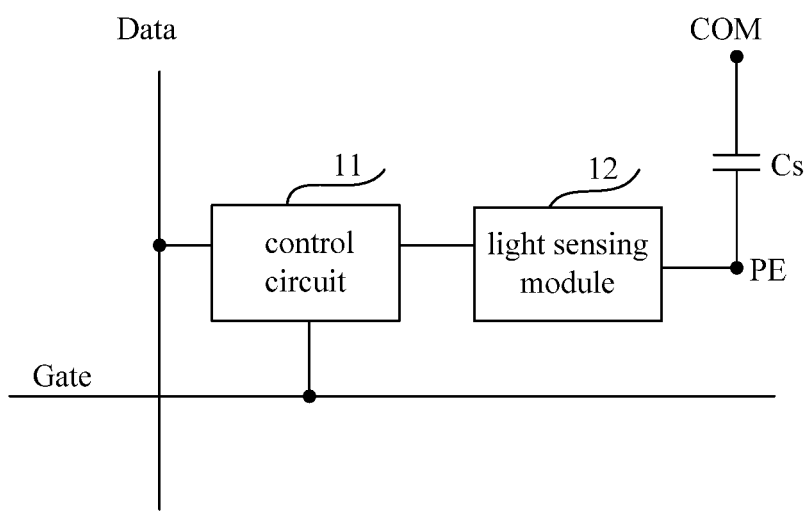
FIG. 2 is a schematic structural diagram of a pixel unit according to some other embodiments of the present disclosure.

In practical implementation, as shown in FIG. 2, the HDR liquid crystal panel further includes a common electrode COM, and a storage capacitor Cs is generated between the pixel electrode PE and the common electrode COM.

When the pixel unit of the present disclosure as shown in FIG. 2 operates, a display period includes a charging stage, a light sensing stage and a maintaining stage.

In the charging stage of the display period, the Data outputs a first voltage; the control circuit 11 controls, under control of the Gate, the Data to be connected to the first end of the light sensing circuit 12 such that the difference between the potential at the first end of the light sensing circuit 12 and the potential at the second end of the light sensing circuit 12 is higher than the preset potential difference; and the control circuit 11 controls the second end of the light sensing circuit 12 to be connected to the pixel electrode PE, and then the storage capacitor Cs is charged by the first voltage output from the Data.

In the light sensing stage of the display period, the Data outputs a second voltage which is smaller than the first voltage; the control circuit 11 controls, under control of the Gate, the Date to be connected to the first end of the light sensing circuit 12 such that the potential at the first end of the light sensing circuit 12 is lower than the potential at the second end of the light sensing circuit 12; and the light sensing circuit 12 converts to a received light signal into a corresponding electrical signal such that the storage capacitor discharges to the Data and a potential at the pixel electrode PE is changed based on the electrical signal.

In the maintaining stage of the display period, the control circuit 11 controls, under control of the Gate, the Data to be disconnected to the first end of the light sensing circuit 12, to maintain the potential of the pixel electrode PE.

Practically, the electrical signal may include at least one of a current signal and a voltage signal, and the HDR liquid crystal panel further includes a liquid crystal layer arranged between the pixel electrode and the common electrode.

Practically, in a case that the electrical signal is the current signal, the electrical signal which is obtained through conversion in the light sensing stage has a direction flowing to the first end of the light sensing circuit 12 from the second end of the light sensing circuit 12. In a case that the light signal received by the light sensing circuit 12 has a relatively large intensity, the corresponding electrical signal which is obtained through conversion has a relatively large current value, and the potential at the pixel electrode PE is relatively low after the light sensing stage; hence, the HDR liquid crystal panel has a high transmittance at a region controlled by the pixel electrode. In a case that the light signal received by the light sensing circuit 12 has a relatively small intensity, the corresponding electrical signal which is obtained through conversion has a relatively small current value, and the potential at the pixel electrode PE is relatively high after the light sensing stage; hence, the HDR liquid crystal panel is controlled to have a low transmittance at a region controlled by the pixel electrode, the transmittance at a dark-state region is low, a black image is darker, thereby enhancing display contrast.

In practical, the HDR liquid crystal panel includes a plurality of partitions, where the quantity of the partitions and shapes of the partitions are not limited herein. A pixel voltage and a transmittance in each partition are independent from those in other partitions and are controllable. The pixel electrode according to embodiments of the present disclosure is arranged in each partition. In each partition, the intensity of light received in the partition is detected using the light sensing circuit (the light sensing circuit may be, for example, a photosensitive element and the photosensitive element may include, for example, a photosensitive diode), deflection states of liquid crystals in the partition are changed by converting a light signal into an electrical signal; hence, the transmittance in the partition is changed, a partition receiving bright light is of high transmittance and a partition receiving dark light is of low transmittance, thereby enhancing a display contrast.

In practical, the HDR liquid crystal panel may be but is not limited to a twisted nematic (TN) liquid crystal panel.

According to some optional embodiments, the control circuit may include a control transistor. A control electrode of the control transistor is connected to a corresponding row of gate line, a first electrode of the control circuit is connected to a corresponding column of data line, and a second electrode of the control circuit is connected to the first end of the light sensing circuit.

According to some optional embodiments, the light sensing circuit may include a photosensitive diode. An anode of the photosensitive diode is connected to the second end of the control circuit and a cathode of the photosensitive diode is connected to the pixel electrode.

Figure 3:
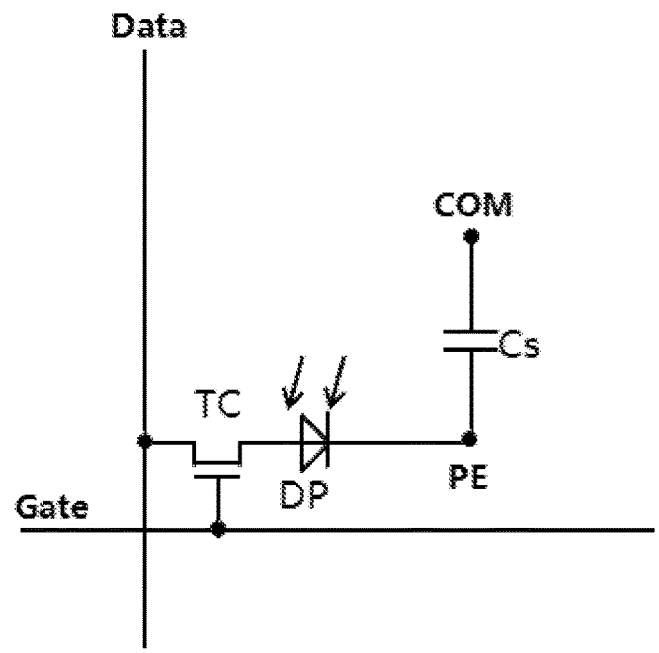
FIG. 3 is a circuit diagram of a pixel unit according to some other embodiments of the present disclosure.

As shown in FIG. 3, a pixel unit according to some embodiments of the present disclosure includes a control circuit, a light sensing circuit and a pixel electrode PE.

The control circuit includes a control transistor TC, and the light sensing circuit includes a photosensitive diode DP.

A gate electrode of the control transistor TC is connected to a corresponding row of gate line Gate, a drain electrode of the control transistor TC is connected to a corresponding column of data line Data and a source electrode of the control transistor TC is connected to an anode of the photosensitive diode DP. A cathode of the photosensitive diode is connected to the pixel electrode PE. A storage capacitor Cs is generated between the pixel electrode PE and a common electrode COM included in the HDR liquid crystal panel.

FIG. 3 is a structural diagram of the pixel unit in each partition of an HDR liquid crystal panel according to a specific embodiment. The pixel unit in each partition includes the control transistor, the photosensitive diode and the pixel electrode. The pixel unit in each partition receives a light signal, analyzes the intensity through the photosensitive diode and adjusts the transmittance. In the embodiment as shown in FIG. 3, the control transistor is a thin-film transistor (TFT); however, the type of the control transistor is not limited herein.

In the embodiment as shown in FIG. 3, the control transistor TC is an n-type transistor. Practically, the TC can be replaced by a p-type transistor and it merely needs to adjust a corresponding control signal. The type of the TC is not limited herein.

The photosensitive diode is also called as a photodiode, which is a light sensor able to convert a light signal into a current signal or a voltage signal. A die of the photosensitive diode is a PN junction having a photosensitive characteristic. The die is very sensitive to light change and has a unidirectional conductivity. A reverse leakage current of the photosensitive diode may be changed according to intensity of light received by the photosensitive diode.

When the pixel unit in the present disclosure as shown in FIG. 3 operates, one frame time Tf (that is one display period) may include a charging stage S1, a light sensing stage S2 and a maintaining stage S3.

Figure 4:
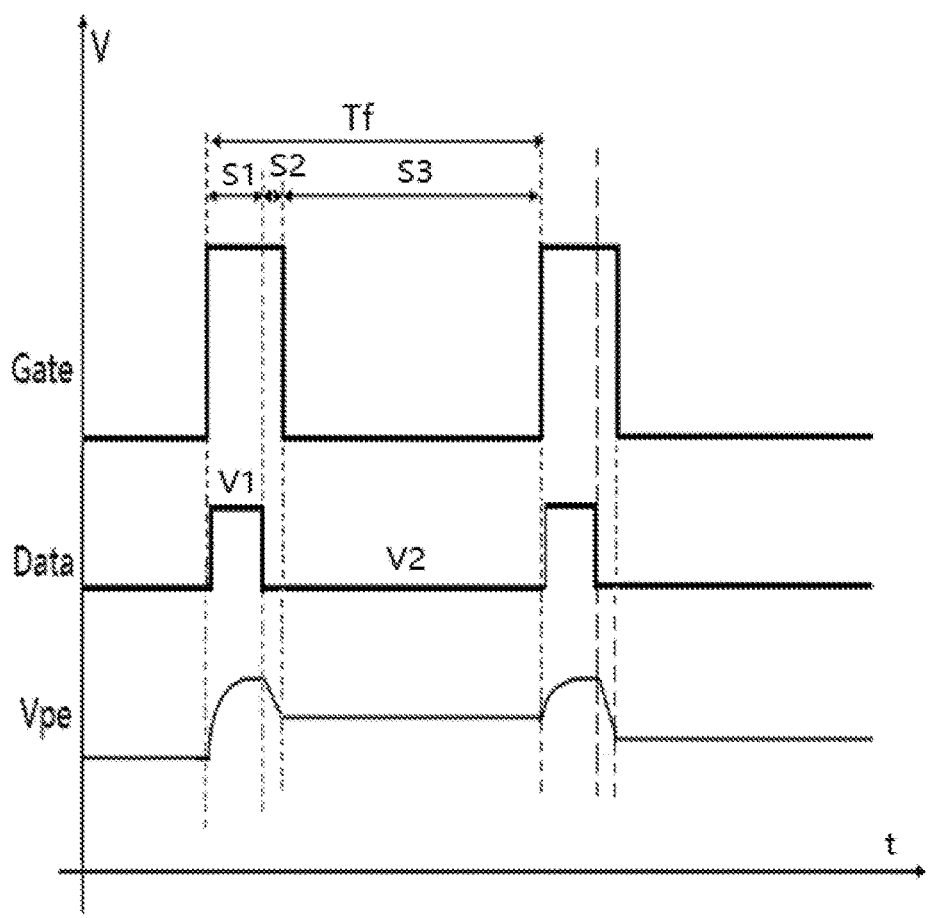
FIG. 4 is a sequential signal diagram of the pixel unit as shown in FIG. 3.

FIG. 4 is a sequential signal diagram of a pixel unit in FIG. 3. As shown in FIG. 4, in the charging stage S1, the Data outputs a first voltage V1, the Gate outputs a high level to make the TC conductive, a source voltage of the TC is increased, the DP is forward conductive, the Cs is charged by V1 such that a voltage Vpe of the PE is increased to a high level Vdh.

In the light sensing stage S2, the Data outputs a second voltage V2 which is smaller than V1, the Gate stills outputs the high level to make the TC conductive, the source voltage of the TC is decreased, the DP is in a reverse bias state, the DP generates reverse electric leakage, a leakage current Ioff(L) can be controlled by light intensity received by the DP, the Ioff(L) is a current value of a current signal converted by the DP from the light signal received by the DP, the current signal flows from the cathode of the DP to the anode of the DP, and the voltage Vpe of the PE is decreased to Vdh−t2×Ioff(L) where t2 is a duration of the light sensing stage S2; hence, respective partitions of the HDR liquid crystal panel have different transmittances.

In the maintaining stage S3, the Gate outputs a low level, the TC is turned off, Vpe of the PE maintains unchanged, and transmittances of respective partitions of the HDR liquid crystal panel maintain unchanged.

In the light sensing stage S2, the TC is turned on, the voltage outputted by the Data is lower than that outputted in the charging stage S1, such that the DP is in reverse bias state, the reverse current of the DP changes along with the intensity of the light received by the DP, the higher the density is, the higher the reverse current is and the more the voltage of the PE decreases, and accordingly, the higher the transmittance in a corresponding partition is. Otherwise, the smaller the density of the light received by the DP is, the smaller the reverse current of the DP is, the less the voltage of the PE decreases, and accordingly, the lower the transmittance in a corresponding partition is.

In FIG. 4, a horizontal axis is time t which is shown in seconds and a vertical axis is voltage which is shown in volts.

A pixel driving method according to an embodiment of the present disclosure is applied to an HDR liquid crystal panel. The HDR liquid crystal panel includes a common electrode. The pixel driving method is configured to drive the above-mentioned pixel unit, where a storage capacitor is generated between the pixel electrode and the common electrode. One display period includes a charging stage, a light sensing stage and a maintaining stage that are set successively.

In one display period, the pixel driving method includes:

in the charging stage, outputting a first voltage by a corresponding column of data line; controlling, by a control circuit under control of a corresponding row of gate line, the corresponding column of data line to be connected to a first end of a light sensing circuit to enable that a difference between a potential at the first end of the light sensing circuit and a potential at a second end of the light sensing circuit is higher than a preset potential difference; and controlling, by the control circuit, a second end of the control circuit to be connected to a pixel electrode to charge the storage capacitor using the first voltage outputted by the corresponding column of data line;

in the light sensing stage, outputting a second voltage by the corresponding column of data line, where the second voltage is lower than the first voltage; controlling, by the control circuit under control of the corresponding row of gate line, the corresponding column of data line to be connected to the first end of the light sensing circuit to enable that the potential at the first end of the light sensing circuit is lower than the potential at the second end of the light sensing circuit; and converting, by the light sensing circuit, a light signal received by the light sensing circuit into a corresponding electrical signal such that the storage capacitor discharges to the data line and a potential at the pixel electrode is changed based on the electrical signal; and in the maintaining stage, controlling, by the control circuit under control of the corresponding row of gate line, the corresponding column of data line to be disconnected to the first end of the light sensing circuit to maintain the potential at the pixel electrode.

Specifically, the light sensing circuit includes a photosensitive diode, the first end of the light sensing circuit is an anode of the photosensitive diode and the second end of the light sensing circuit is a cathode of the photosensitive diode. The step of converting, by the light sensing circuit, the light signal received by the light sensing circuit into the corresponding electrical signal includes: converting, by the photosensitive diode, the light signal received by the photosensitive diode into a current signal, where a direction of the current signal flows from the cathode of the photosensitive diode to the anode of the photosensitive diode.

An HDR liquid crystal panel according to an embodiment of the present disclosure includes: a plurality of abovementioned pixel units that are arranged in an array, a plurality of gate lines and a plurality of data lines. Each gate line extends in a row direction and each data line extends in a column direction. The plurality of pixel units located at an identical row is connected to a corresponding row of gate line. The plurality of pixel units located at an identical column is connected to a corresponding column of data line. The liquid crystal panel according to the embodiment of the present disclosure includes a substrate and the pixel units are arranged on the substrate. The liquid crystal panel is a high dynamic range (HDR) liquid crystal panel.

The present disclosure provides, in an embodiment, an HDR liquid crystal panel, which determines the transmittance of the panel according to brightness of image in partitions. In this way, the image in a dark-state region is darker and the contrast is enhanced.

A display device according to an embodiment of the present disclosure includes the above-mentioned liquid crystal panel and a display panel corresponding to the liquid crystal panel. The liquid crystal panel is located at a light-outgoing side of the display panel. The liquid crystal panel is a high dynamic range (HDR) liquid crystal panel.

In practical, the liquid crystal panel according to the embodiment of the present disclosure is the HDR liquid crystal panel and the HDR liquid crystal panel may be incorporated with the display panel to achieve an effect of high dynamic contrast. The HDR liquid crystal panel may to detect light signals (which may be light intensity signals) of lights emitted by the display panel and received in respective partitions by using the light sensing circuit, convert the light signals into electrical signals, change deflection states of liquid crystals in the respective partitions to further change transmittances of the respective partitions, such that the transmittance of a partition receiving bright light is high, the transmittance of a partition receiving dark light is low, and a black image is darker, thereby enhancing dynamic display contrast.

Specifically, the display panel is partitioned into a plurality of display regions. The plurality of display regions has a one-to-one correspondence with the plurality of pixel units of the liquid crystal panel. Each pixel unit of the liquid crystal panel is arranged in one partition of the liquid crystal panel. The display panel may include a liquid crystal display panel, an OLED (organic light emitting display) panel and the like.

According to some optional embodiments, the display panel includes a plurality of pixels that are arranged in an array. Each pixel may include a red sub-pixel, a green sub-pixel and a blue sub-pixel. One or more pixels may be provided in one display region.

Figure 5:
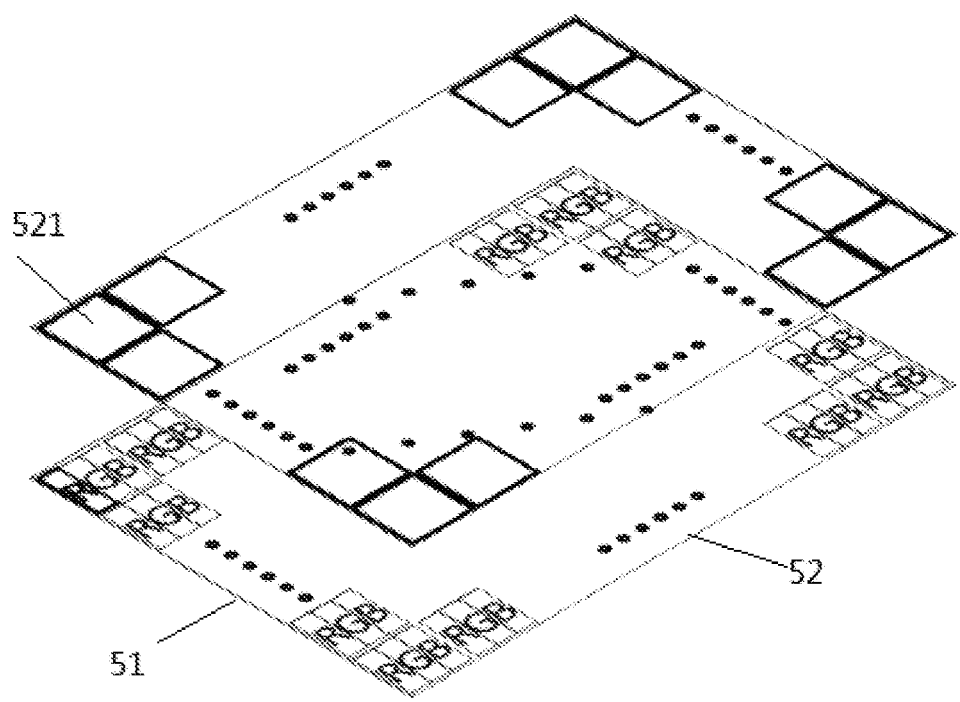
FIG. 5 is a schematic structural diagram of a display device according to some embodiments of the present disclosure.

According to some optional embodiments, as shown in FIG. 5, one pixel is provided in each display region of a display panel 51 and the pixel includes a red sub-pixel R, a green sub-pixel G and a blue sub-pixel B. Each partition 521 of the HDR liquid crystal panel 52 is provided with the pixel unit (not shown in FIG. 5). The plurality of display regions and the plurality of pixel units have a one-to-one correspondence. A light sensing circuit included in the pixel unit is configured to receive a light signal sent from the display region of the display panel corresponding to the pixel unit.

Specifically, the display device according to an embodiment of the present disclosure further includes an edge-type backlight source arranged at a lateral side of the display panel to achieve ultra-thin HDR effect.

With the display device in the embodiment of the present disclosure, it is unnecessary to adjust brightness of the backlight source, so service life of the backlight source can be prolonged. In addition, the display device in the embodiment of the present disclosure does not need to increase the quantity of backlight sources to increase the quantity of the HDR partitions; hence, the quantity of the backlight sources can be reduced and the cost can be lowered. The HDR liquid crystal panel in the display device according to the embodiment of the present disclosure includes many partitions, so effect of a boundary between the bright and the dark can be alleviated. In the display device according to the embodiment of the present disclosure, the HDR liquid crystal panel is partitioned, and transmittance of the HDR liquid crystal panel is adjusted according to intensities of lights received in respective partitions from the display panel such that an image in a dark-state display region is darker; hence, dark-state light leakage can be alleviated dynamically and an overall display contrast can be improved.

Optional embodiments of the present disclosure are described hereinabove. It should be noted that, various improvements and polishment can made by the ordinary skilled in the art without departing from the principle of the present disclosure, and these improvements and polishment shall fall within the protection scope of the present disclosure.

What is claimed is:

1. A method for driving a pixel unit, wherein the pixel unit comprises a pixel electrode, a control circuit, a light sensing circuit, a data line and a gate line;
wherein a control end of the control circuit is connected to the gate line, a first end of the control circuit is connected to the date line, a second end of the control circuit is connected to a first end of the light sensing circuit, and a second end of the light sensing circuit is connected to the pixel electrode;
the control circuit is configured to control, under control of the gate line, the data line to be connected to the first end of the light sensing circuit; and
the light sensing circuit is configured to control the second end of the control circuit to be connected to the pixel electrode in a case that a difference between a potential at the first end of the light sensing circuit and a potential at the second end of the light sensing circuit is higher than a first potential difference, and is further configured to convert a light signal received by the light sensing circuit into an electrical signal in a case that the potential at the first end of the light sensing circuit is lower than the potential at the second end of the light sensing circuit;
wherein the pixel unit further comprises a storage capacitor and a common electrode, one end of the storage capacitor is connected to the pixel electrode and the other end of the storage capacitor is connected to the common electrode, and a display period of the pixel unit comprises a charging stage, a light sensing stage and a maintaining stage that are set successively;
wherein the method comprises:
in the charging stage, outputting a first voltage by the data line; controlling, by the control circuit under control of the gate line, the data line to be connected to the first end of the light sensing circuit to enable that the difference between the potential at the first end of the light sensing circuit and the potential at the second end of the light sensing circuit is higher than the first potential difference; and controlling, by the control circuit, the second end of the control circuit to be connected to the pixel electrode to charge the storage capacitor using the first voltage outputted by the data line;
in the light sensing stage, outputting a second voltage by the data line, wherein the second voltage is lower than the first voltage; controlling, by the control circuit under control of the gate line, the data line to be connected to the first end of the light sensing circuit to enable that the potential at the first end of the light sensing circuit is lower than the potential at the second end of the light sensing circuit; and converting, by the light sensing circuit, the light signal received by the light sensing circuit into the electrical signal such that the storage capacitor discharges to the data line and a potential at the pixel electrode is changed based on the electrical signal; and
in the maintaining stage, controlling, by the control circuit under control of the gate line, the data line to be disconnected to the first end of the light sensing circuit to maintain the potential at the pixel electrode.

2. A method for driving a pixel unit, wherein the pixel unit comprises a pixel electrode, a control circuit, a light sensing circuit, a data line and a gate line;
wherein a control end of the control circuit is connected to the gate line, a first end of the control circuit is connected to the date line, a second end of the control circuit is connected to a first end of the light sensing circuit, and a second end of the light sensing circuit is connected to the pixel electrode;
the control circuit is configured to control, under control of the gate line, the data line to be connected to the first end of the light sensing circuit; and
the light sensing circuit is configured to control the second end of the control circuit to be connected to the pixel electrode in a case that a difference between a potential at the first end of the light sensing circuit and a potential at the second end of the light sensing circuit is higher than a first potential difference, and is further configured to convert a light signal received by the light sensing circuit into an electrical signal in a case that the potential at the first end of the light sensing circuit is lower than the potential at the second end of the light sensing circuit;

the control circuit comprises a control transistor, a control electrode of the control transistor is connected to the gate line, a first electrode of the control transistor is connected to the data line, and a second electrode of the control transistor is connected to the first end of the light sensing circuit, wherein the pixel unit further comprises a storage capacitor and a common electrode, one end of the storage capacitor is connected to the pixel electrode and the other end of the storage capacitor is connected to the common electrode, and a display period of the pixel unit comprises a charging stage, a light sensing stage and a maintaining stage that are set successively;

wherein the method comprises:

in the charging stage, outputting a first voltage by the data line; controlling, by the control circuit under control of the gate line, the data line to be connected to the first end of the light sensing circuit to enable that the difference between the potential at the first end of the light sensing circuit and the potential at the second end of the light sensing circuit is higher than the first potential difference; and controlling, by the control circuit, the second end of the control circuit to be connected to the pixel electrode to charge the storage capacitor using the first voltage outputted by the data line;

in the light sensing stage, outputting a second voltage by the data line, where the second voltage is lower than the first voltage; controlling, by the control circuit under control of the gate line, the data line to be connected to the first end of the light sensing circuit to enable that the potential at the first end of the light sensing circuit is lower than the potential at the second end of the light sensing circuit; and converting, by the light sensing circuit, the light signal received by the light sensing circuit into the electrical signal such that the storage capacitor discharges to the data line and a potential at the pixel electrode is changed based on the electrical signal; and in the maintaining stage, controlling, by the control circuit under control of the gate line, the data line to be disconnected to the first end of the light sensing circuit to maintain the potential at the pixel electrode.

3. A method for driving a pixel unit, wherein the pixel unit comprises a pixel electrode, a control circuit, a light sensing circuit, a data line and a gate line;

wherein a control end of the control circuit is connected to the gate line, a first end of the control circuit is connected to the date line, a second end of the control circuit is connected to a first end of the light sensing circuit, and a second end of the light sensing circuit is connected to the pixel electrode;

the control circuit is configured to control, under control of the gate line, the data line to be connected to the first end of the light sensing circuit; and the light sensing circuit is configured to control the second end of the control circuit to be connected to the pixel electrode in a case that a difference between a potential at the first end of the light sensing circuit and a potential at the second end of the light sensing circuit is higher than a first potential difference, and is further configured to convert a light signal received by the light sensing circuit into an electrical signal in a case that the potential at the first end of the light sensing circuit is lower than the potential at the second end of the light sensing circuit, wherein the light sensing circuit comprises a photosensitive diode, an anode of the photosensitive diode is connected to the second end of the control circuit, and a cathode of the photosensitive diode is connected to the pixel electrode, and wherein the first potential difference is equal to a break-over voltage of the photosensitive diode, wherein the pixel unit further comprises a storage capacitor and a common electrode, one end of the storage capacitor is connected to the pixel electrode and the other end of the storage capacitor is connected to the common electrode, and a display period of the pixel unit comprises a charging stage, a light sensing stage and a maintaining stage that are set successively;

wherein the method comprises:

in the charging stage, outputting a first voltage by the data line; controlling, by the control circuit under control of the gate line, the data line to be connected to the first end of the light sensing circuit to enable that the difference between the potential at the first end of the light sensing circuit and the potential at the second end of the light sensing circuit is higher than the first potential difference; and controlling, by the control circuit, the second end of the control circuit to be connected to the pixel electrode to charge the storage capacitor using the first voltage outputted by the data line;

in the light sensing stage, outputting a second voltage by the data line, where the second voltage is lower than the first voltage; controlling, by the control circuit under control of the gate line, the data line to be connected to the first end of the light sensing circuit to enable that the potential at the first end of the light sensing circuit is lower than the potential at the second end of the light sensing circuit; and converting, by the light sensing circuit, the light signal received by the light sensing circuit into the electrical signal such that the storage capacitor discharges to the data line and a potential at the pixel electrode is changed based on the electrical signal; and in the maintaining stage, controlling, by the control circuit under control of the gate line, the data line to be disconnected to the first end of the light sensing circuit to maintain the potential at the pixel electrode.

4. The method according to claim 3, wherein the step of converting, by the light sensing circuit, the light signal received by the light sensing circuit into the electrical signal comprises: converting, by the photosensitive diode, the light signal received by the photosensitive diode into a current signal, wherein a direction of the current signal flows from the cathode of the photosensitive diode to the anode of the photosensitive diode.

* * * * *